United States Patent [19]

Lindner

[11] 3,986,753

[45] Oct. 19, 1976

[54] ROLLING-ELEMENT BEARING

[76] Inventor: Wolfram Lindner, 4322 Sprockhovel 2, D-6000 Hermessiepen, Germany

[22] Filed: Jan. 20, 1976

[21] Appl. No.: 650,758

[30] Foreign Application Priority Data

Jan. 28, 1975 Germany............................ 2503320

[52] U.S. Cl............................................. 308/184 R
[51] Int. Cl.²......................................... F16C 33/30
[58] Field of Search............ 308/183, 184 R, 184 A, 308/187

[56] References Cited
UNITED STATES PATENTS

| | | | |
|---|---|---|---|
| 3,025,114 | 3/1962 | Beecher.............................. | 308/183 |
| 3,512,856 | 5/1970 | Robinson........................ | 308/184 R |
| 3,653,731 | 4/1972 | Rau.................................. | 308/184 R |
| 3,809,445 | 5/1974 | Hallerback.......................... | 308/184 |

*Primary Examiner*—M. H. Wood, Jr.
*Assistant Examiner*—Gene A. Church
*Attorney, Agent, or Firm*—Spencer & Kaye

[57] ABSTRACT

A rolling-element bearing has concentrically arranged, radially spaced first and second race surfaces rotating with respect to one another during operation of the bearing and a rolling element which is in rolling contact with the first and second race surfaces. The rolling element is constituted by at least one rolling ring surrounding the rotary axis of the bearing and having radially inner and radially outer rolling surfaces of circular course. The rolling surfaces of the rolling ring are eccentric with respect to one another; the maximum radial distance between the rolling surfaces of the rolling ring corresponds to the radial distance between the first and second race surfaces. The radially inner rolling surface of the rolling ring is in continuous rolling engagement with one of the race surfaces, whereas the radially outer rolling surface of the rolling ring is in continuous rolling engagement with the other of the race surfaces.

13 Claims, 13 Drawing Figures

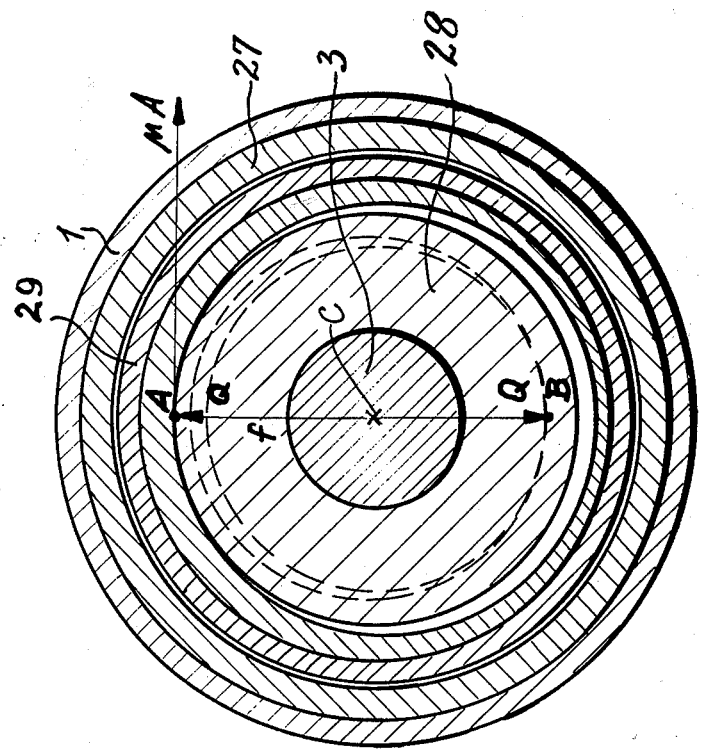
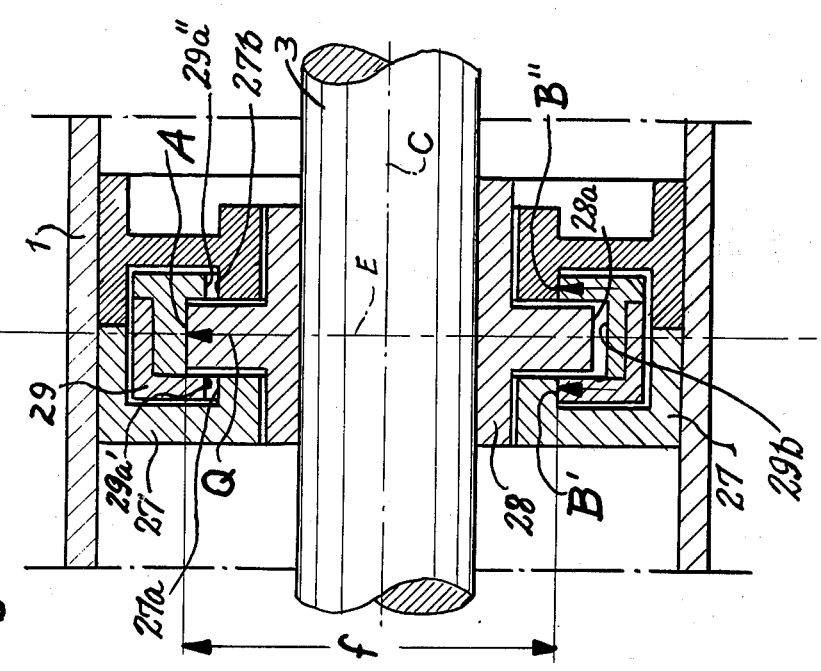

ROLLING-ELEMENT BEARING

BACKGROUND OF THE INVENTION

This invention relates to a rolling-element bearing of the general type that has concentrically arranged inner and outer races with the rolling element disposed between the races and in contact therewith. The inner and outer races are usually constituted by inner and outer rings, respectively. Conventionally, one of the races is affixed to a stationary housing, while the other race is fitted on a rotary member, such as a shaft to be supported, and is thus rotating therewith. The rolling element supports the inner and outer races with respect to one another and provides for their centering. As the inner and outer races rotate with respect to one another, the rolling element will rotate on and with respect to the race surfaces.

According to prior art structures, the rolling element is constituted by a plurality of discrete rolling bodies such as balls, cylinders of various shapes, needles, etc. It is characteristic of these rolling bodies that they have a relatively small diameter and further, at the inner race there always occurs a contact between two convex faces. These phenomena result in high Hertz's stresses which are beyond the fatigue strength of the material. Consequently, for increasing rpm's the load capacities are significantly reduced.

SUMMARY OF THE INVENTION

It is an object of the invention to provide an improved rolling-element bearing in which the Hertz's stresses are reduced to a fraction of those inherent in conventional rolling-element bearing structures.

This object and others to become apparent as the specification progresses, are accomplished by the invention, according to which, briefly stated, the rolling element is constituted by at least one rolling ring surrounding the rotary axis of the bearing and having radially inner and radially outer rolling surfaces of circular course. The rolling surfaces of the rolling ring are eccentric with respect to one another; the maximum radial distance between the rolling surfaces of the rolling ring corresponds to the radial distance between the first and second race surfaces. The radially inner rolling surface of the rolling ring is in continuous rolling engagement with one of the race surfaces, whereas the radially outer rolling surface of the rolling ring is in continuous rolling engagement with the other of the race surfaces.

Thus, in the above-outlined rolling-element bearing, of any two mutually contacting surfaces at least one has a concave configuration. Stated differently, the rolling-element bearing structured according to the invention has no convex-to-convex contact arrangements.

In order to provide a plurality of contact locations distributed circumferentially, the rolling-element bearing according to the invention has a plurality of axially spaced rolling rings of identical shape and dimension but of angularly offset orientation. To ensure that the rolling rings forming part of one and the same bearing are of identical dimensions, it is expedient to machine them on the same machine tool during simultaneous machining operations.

The rolling-element bearing structured according to the invention ensures a relatively slow application and removal of load as the rolling ring rotates, whereby the operational noises and the sensitivity of the bearing to impact-like loads are significantly reduced. Further, the diameter of the stub which forms part of the shaft to be supported and which has to be designed as a function of the load capacity of the bearing, can be significantly reduced.

BRIEF DESCRIPTION OF THE DRAWINGS

FIGS. 10 and 11 are, respectively, axial and cross-sectional views of still another preferred embodiment of the invention.

DESCRIPTION OF THE PREFERRED EMBODIMENTS

Figure 1:
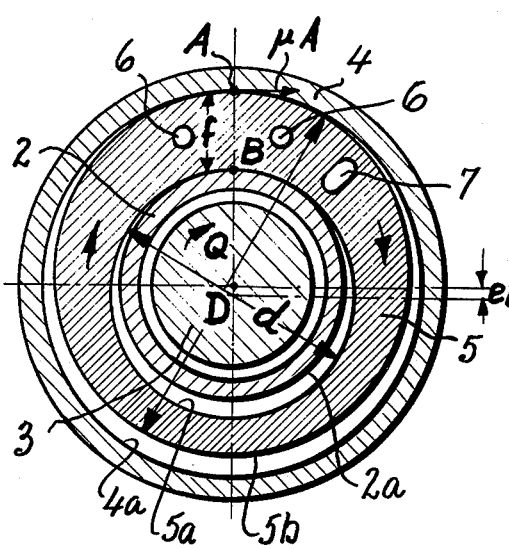
FIGS. 1 and 2 are, respectively, cross-sectional and axial sectional views of a preferred embodiment of the invention.
Figure 2:
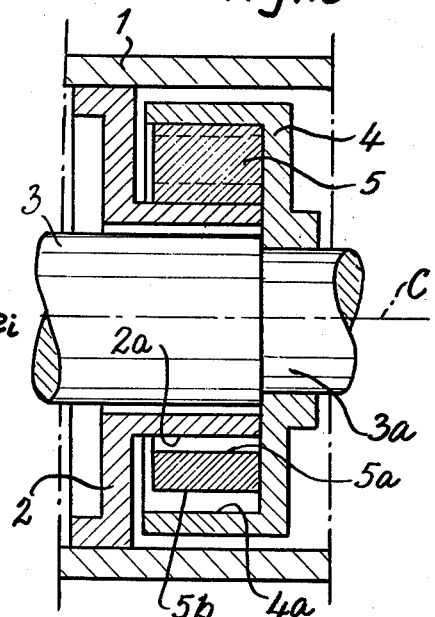

Turning now to the embodiment illustrated in FIGS. 1 and 2, to the inside face of a bearing shell or housing 1 there is secured a stationary race 2 which has a race surface 2a of circular course. The stub 3a of a rotary shaft 3 to be supported by the bearing, is inserted, for example, by press-fitting, into the central circular opening of a rotary race 4 having a race surface 4a of circular course. The race surfaces 2a and 4a are arranged concentrically with respect to one another.

A rolling ring 5 is inserted between the stationary race surface 2a and the rotary race surface 4a in such a manner that the rolling ring 5 surrounds the rotary bearing axis C. The rolling ring 5 has an inner peripheral rolling surface 5a and an outer peripheral rolling surface 5b, both of circular course. As may be well observed particularly in FIG. 1, the inner peripheral rolling surface 5a, having a diameter $d$, and the outer peripheral rolling surface 5b, having a diameter $D$, are eccentrically located with respect to one another. As a result, the radially measured dimension of the rolling ring 5 is not uniform along the circumference of the rolling ring 5. It may be further observed in FIG. 1 that the diameter $d$ of the radially inner rolling surface 5a is somewhat greater than the diameter of the race surface 2a cooperating with the rolling surface 5a and the diameter $D$ of the radially outer rolling surface 5b is somewhat smaller than the diameter of the race surface 4a cooperating with the rolling surface 5b. The maximum radial distance between the rolling surfaces 5a and 5b of the rolling ring 5 substantially equals the radial distance between the concentrically arranged race surfaces 2a and 4a and thus, the portion of maximum radial dimension of the rolling ring will be in contact with the stationary and rotary race surfaces.

More particularly, the radially outer rolling surface $5b$ of the rolling ring 5 contacts the rotary race surface $4a$ at contact location A, whereas the radially inner rolling surface $5a$ of the rolling ring 5 contacts the stationary race surface $2a$ at contact location B. The rolling surface $5a$ of the rolling ring 5 has an eccentricity $e_i$ with regard to the bearing axis C. It is seen that the smaller the eccentricity $e_i$, the greater the osculation of the contacting arcuate surfaces. It is also seen that due to the significantly larger diametrical dimensions of the rolling ring (as compared to conventional rolling elements) and the always present at least one concave contact surface, the surface contacts (osculation) are of higher order than in conventional arrangements.

Upon rotation of the shaft 3, at point A a tangential frictional force $\mu A$ is generated which is a function of the pressing force (supplied by the load Q) at point A and the coefficient of friction $\mu$. This force generates, with an arm $f$, a torque $\mu A f$ about contact location B resulting in a clockwise rotation (as viewed in FIG. 1) of the rolling ring 5. Thus, contact locations A and B will rotate as a unit with the rolling ring 5.

It is noted that the stationary and rotary races 2 and 4 are expediently so arranged with respect to the shaft 3 that the rolling ring 5 rotates in the same sense as the shaft 3, which is advantageous from the point of view of lubrication. It will be understood that if the housing 1 rotates and the shaft 3 is stationary, it is the race 2 which will function as the rotary race and the race 4 will assume the role of the stationary race. Further, the materials of components 2, 4 and 5 may be those conventionally used for race structures and rolling elements in rolling-element bearings.

Bore holes 6 provided in the rolling ring 5 serve the purpose of balancing the latter with respect to the shaft axis. The rolling ring 5 may further be provided with one or more slot-like openings 7 (one shown in FIG. 1) for accommodating coupling pins (not shown) attached to the rotary race 4 or to an axially adjacent, further rolling ring in a structure as will be described later in connection with FIG. 5.

Figure 3:
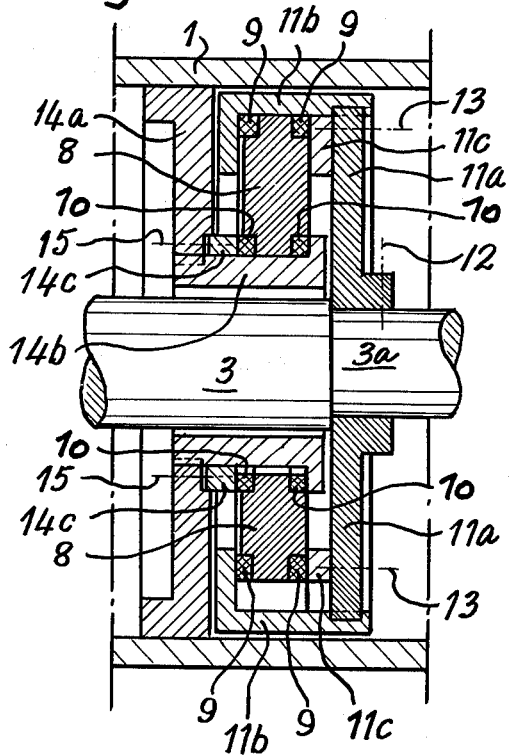
FIGS. 3 and 4 are axial sectional views of two modifications of the embodiment of FIGS. 1 and 2.
Figure 4:
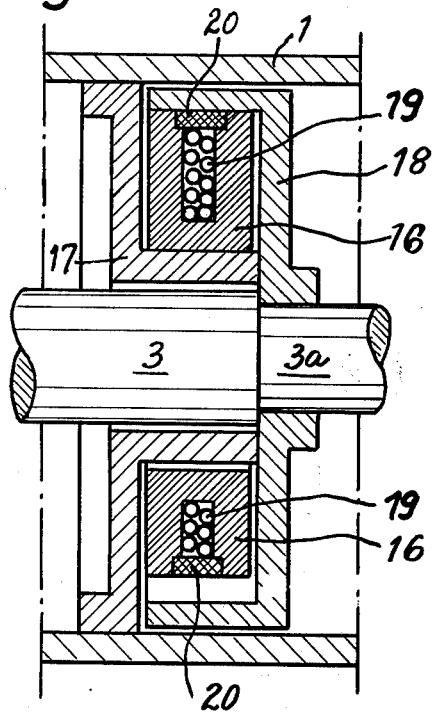

It will be appreciated that during idling runs, that is, when the force A is small, the torque $\mu A f$ has to be increased to ensure that the rolling ring will, in fact, execute a rolling motion, rather than a sliding motion, with respect to the stationary and rotary races. FIGS. 3 and 4 illustrate modifications of the basic embodiment of FIGS. 1 and 2, including arrangements which provide for such a torque increase.

Turning now to FIG. 3, the rolling ring 8 is provided at its inner and outer periphery, on both sides, with circumferential recesses, each of which seats a strip 9 (at the outer periphery of the rolling ring 8) and a strip 10 (at the inner periphery of the rolling ring 8). The rotary race is constituted by components $11a$, $11b$ and $11c$. The component $11a$ is a radial disc having a central opening which receives the stub $3a$ of the shaft 3. The disc $11a$ is affixed to the stub shaft $3a$, for example, by means of a set screw 12, only symbolically shown. The annular collar-like component $11b$ which has an inner cylindrical face constituting a race surface, is affixed to the periphery of the disc component $11a$. The component $11c$ is an annulus disposed between the disc component $11a$ and the rolling ring 8 and is secured to the disc component $11a$ by means of circumferentially distributed screws 13 (only symbolically shown). The screws 12 urge the annulus $11c$ into frictional contact with the adjoining strip member 9. The strip member 9 which is remote from the annulus $11c$ is, in turn, urged by the annulus $11c$ into frictional contact with a flange part of the race component $11b$.

Similarly, the stationary race of the rolling-element bearing shown in FIG. 3 is formed of components $14a$, $14b$ and $14c$. The disc-like component $14a$ is, for example, press-fitted to the bearing housing 1 and carries a hub member $14b$, the outer, cylindrical face of which constitutes a race surface. The component $14c$ is an annulus arranged between the disc member $14a$ and the rolling ring 8 and is urged against the adjoining strip 10 by circumferentially distributed screws 15 (only symbolically shown) which also secure the annulus $14c$ to the disc member $14a$. The screws 15 urge the annulus $14c$ in frictional contact with the adjoining strip 10 while, at the same time, the strip 10, which is remote from the annulus $14c$, is urged against a flange part of the component $14b$. In this manner, frictional contact is increased between the races on the one hand and the rolling ring, on the other hand. The strips 9 and 10 may be made, for example, of steel.

FIG. 4 shows a modified arrangement for increasing the frictional force between the rolling ring and the race surface. In this structure, a rolling ring 16 which, as in the previously described embodiments, is positioned between a stationary race 17 and a rotary race 18, is provided with a circumferentially extending cavity filled with shiftable bodies such as powder, shots, balls or fragments 19. The cavity is closed off by a ring 20 made of a material which is radially flexible, such as rubber or steelband. In operation, the rotation of the rolling ring 16 will cause, by virtue of centrifugal forces, the bodies 19 to be urged radially outwardly and, as a result, the ring 20 flexes outwardly into frictional contact with the race surface of the rotary race 18.

Figure 5:
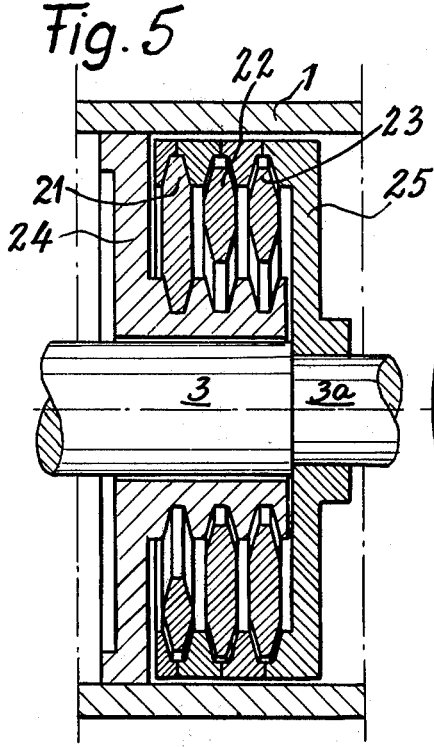
FIG. 5 is an axial sectional view of another preferred embodiment of the invention.
Figure 6:
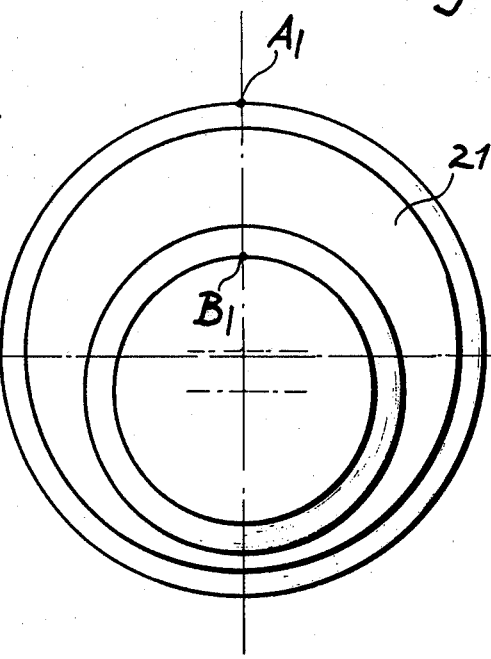
FIG. 6 is a side elevational view — with the radial closure member removed — of the embodiment illustrated in FIG. 5.

In the structures described heretofore, a sole contact pair (that is, one contact location formed of two mutually engaging surfaces) is present. It is expedient, however, for the purpose of a better centering and load distribution, to provide a plurality of contact pairs distributed uniformly in the circumferential direction of the rolling-element bearing. Such a structure is illustrated in FIG. 5. In this embodiment there are provided a plurality (in this instance, three) axially spaced rolling rings 21, 22 and 23. Accordingly, the stationary race 24 and the rotary race 25 each has three axially spaced race surfaces. FIG. 6 schematically illustrates the contact pair $A_1$ and $B_1$ associated with the one rolling ring 21.

Figure 7:
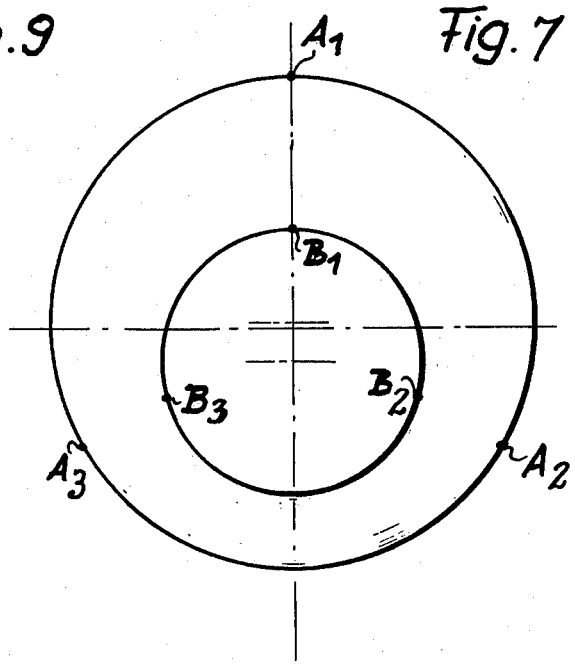
FIG. 7 is a diagram illustrating the distribution of contact locations in the embodiment of FIGS. 5, 6 and 7.

The rolling rings 21, 22 and 23 are angularly offset 120° with respect to one another. This results in a uniform contact pair distribution for the rolling-element bearing as a whole as it may be seen in the schematic illustration of FIG. 7. The contact pair associated with the rolling ring 22 is designated at $A_2$, $B_2$ whereas the contact pair of rolling ring 23 is designated at $A_3$ and $B_3$. It follows that in case six rolling rings are used in the rolling-element bearing, the angle of offset between adjoining rolling rings will be 60° and, accordingly, there will be six contact pairs distributed at 60° intervals. It is noted that the rolling rings 21, 22 and 23 may be coupled to one another by a connecting pin (not shown) projecting through slot-like openings 7 provided in the rolling rings, as seen in FIG. 1.

For increasing the contact pressure, the radially outer circumferential marginal portions of the rolling rings 21, 22 and 23 taper radially outwardly and, accordingly, the cooperating race surfaces of the race 25 are constituted by grooves that narrow in depth. Similarly, the radially inner circumferential marginal portions of the rolling rings 21, 22 and 23 taper radially inwardly and, accordingly, the cooperating race surfaces of the race 24 are constituted by grooves that narrow in depth. The cross section of the rolling ring 21 is particularly well seen in FIG. 8.

Figures 8, 9:
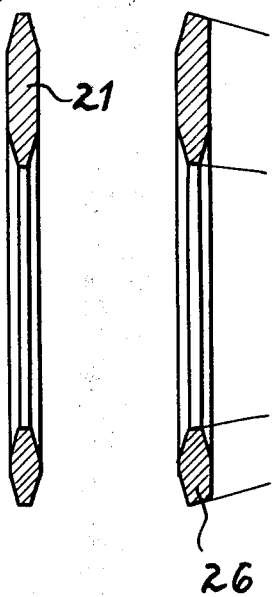
FIG. 8 is a sectional view of a rolling ring adapted to find application in the embodiment of FIGS. 5 and 6.
FIG. 9 is a sectional view of a rolling ring adapted to find application in a rolling-element bearing with frustoconical race surfaces.

In FIG. 9, there is illustrated a rolling ring 26, the radially outer and inner rolling faces of which have a frustoconical configuration for use in a conical rolling-element bearing, that is, where the race surfaces have a frustoconical rather than a cylindrical shape.

Turning now to the embodiment illustrated in FIGS. 10 and 11, a stationary race 27 is attached to the housing 1 and has race surfaces 27a and 27b. A rotary race 28 is attached to the shaft 3 and has a race surface 28a. A rolling ring 29 disposed between the races 27 and 28 has radially inner rolling surfaces 29a' and 29a'' on either side of a central radial plane E. The rolling ring 29 further has a radially outer rolling surface 29b which is positioned between the flanking, radially inner rolling surfaces 29a' and 29a''. This embodiment significantly differs from the previously described structures in that the radially inner and outer rolling surfaces of the rolling ring are both provided at the inner perimeter of the rolling ring and thus the outer perimeter thereof has no role in the bearing function. Accordingly, in this embodiment, as it may be well observed in FIGS. 10 and 11, the radially inner rolling surfaces 29a' and 29a'' are eccentric with respect to the radially outer rolling surface 29b of the rolling ring 29. As a result of this arrangement, as may be particularly well observed in FIG. 11, the contact locations of the contact pair are on opposite sides of the axis of rotation C. This results in a significantly greater torque arm $f$ compared to that present in the earlier-described embodiments. If, again, one assumes a tangential force acting in contact location A, the torque $\mu A f$ about contact location B will be significantly greater and thus the rolling friction at location B will be more easily overcome. As seen in FIG. 10, the contact location B is divided into contact location B' (contact between surfaces 27a and 29a') and contact location B'' (contact between surfaces 27b and 29a''). Thus, the contact locations B', B'' are arranged on either side (in the axial direction) of the contact location A (contact between the race surface 28a and the rolling ring surface 29b). In this manner the generation of any tilting moment about an axis perpendicular to the rotary axis C is prevented.

Figure 12:
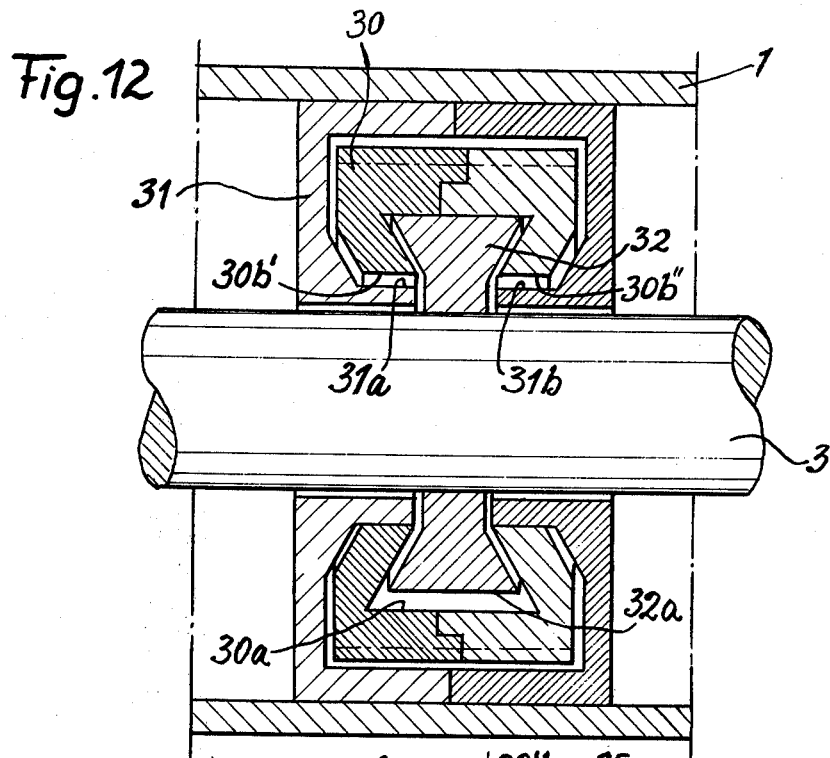
FIGS. 12 and 13 are axial sectional views of two modifications of the embodiment illustrated in FIGS. 10 and 11.

Turning now to FIG. 12, the rolling-element bearing is similar to the embodiment shown in FIGS. 10 and 11 and is particularly adapted for heavy-duty operation. Accordingly, the rolling ring 30 is of a particularly robust structure and has a dovetail-shaped annular groove, the base 30a of which constitutes the radially outer rolling surface, while the two axially outer shoulders of the dovetail-shaped groove constitute the radially inner rolling surfaces 30b' and 30b''. The rolling ring 30 is positioned between the stationary race 31 having race surfaces 31a and 31b and a rotary race 32 having a race surface 32a.

Figure 13:
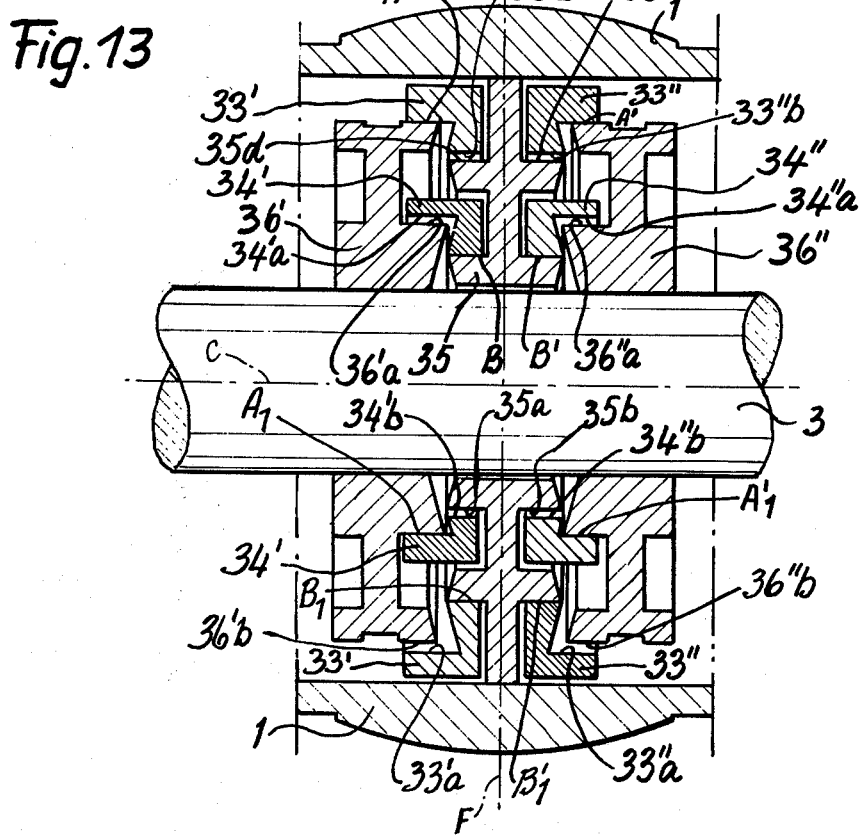

Turning now to FIG. 13, there is shown a rolling-element bearing structure which operates on the same principle as the embodiments illustrated in FIGS. 10 and 12, but wherein two contact pairs are present. In this embodiment, there is provided a radially outer rolling ring formed of two mirror-image halves 33' and 33'' and a radially inner rolling ring formed of two mirror-image halves 34' and 34''. The rolling ring half 33' has radially outer and inner rolling surfaces 33'a and 33'b. The rolling ring half 33'' has radially outer and inner rolling surfaces 33''a and 33''b. Similarly, the radially inwardly positioned rolling ring half 34' has radially outer and inner rolling surfaces 34'a and 34'b. The radially inner rolling ring half 34'' has radially outer and inner rolling surfaces 34''a and 34''b.

The stationary race 35 has race surfaces 35a and 35b cooperating, respectively, with rolling surfaces 34'b and 34''b as well as race surfaces 35c and 35d cooperating, respectively, with rolling ring surfaces 33''b and 33'b. The rotary race has two mirror-image halves 36' and 36''. The rotary race half 36' has race surfaces 36'a and 36'b cooperating, respectively, with rolling ring surfaces 34'a and 33'a. Similarly, the rotary race half 36'' has a race surface 36''a and 36''b, cooperating, respectively, with race surfaces 34''a and 33''a. The rolling ring halves 33', 33'', the rolling ring halves 34', 34'', the rotary ring half 36' and the rotary ring half 36'' are arranged symmetrically with respect to a central plane F, arranged perpendicularly to the rotary axis C and passing through the stationary race 35.

It is seen that in the structure according to FIG. 13 the contact surfaces are split in half in the radial direction. In this manner the axial width of the contact surfaces is significantly reduced. The contact locations associated with the rotary race 36', 36'' are at A, A' and, diametrically spaced therefrom, at $A_1$ and $A'_1$. Simultaneously, the stationary race 35 is in rolling contact with the rolling rings at B and B' and, diametrically oppositely therefrom, at locations $B_1$ and $B'_1$. Since each roller ring pair determines one contact line for the shaft 3, the position of the shaft will be unequivocally determined by the use of two units shown in FIG. 3.

In the rolling-element bearing structures according to the invention the compression stresses are substantially reduced resulting in a significant increase of life expectancy compared to conventional rolling-element bearings. Likewise, rolling-element bearings structured according to the invention may be used for rpm's for which heretofore slide bearings had to be used.

It will be understood that the above description of the present invention is susceptible to various modifications, changes and adaptations, and the same are intended to be comprehended within the meaning and range of equivalents of the appended claims.

What is claimed is:

1. In a rolling-element bearing having a rotary axis; concentrically arranged, radially spaced first and second race surfaces rotating with respect to one another during operation of the bearing; and a rolling element being in rolling contact with the first and second race surfaces; the improvement wherein said rolling element is constituted by at least one rolling ring surrounding said rotary axis and having radially inner and radially outer rolling surfaces of circular course; said rolling surfaces of said rolling ring are eccentric with respect to one another; the maximum radial distance between said rolling surfaces of said rolling ring corresponding to the radial distance between said first and second race surfaces; said radially inner rolling surface of said rolling ring being in continuous rolling engagement with one of said race surfaces and said radially outer rolling surface of said rolling ring being in continuous rolling engagement with the other of said race surfaces.

2. A rolling-element bearing as defined in claim 1, wherein said rolling ring has inner and outer perimeters; said radially inner rolling surface being arranged at said inner perimeter and said radially outer rolling surface being arranged at said outer perimeter; the location of rolling engagement between said radially inner rolling surface of said rolling ring and one of said race surfaces and the location of rolling engagement between said radially outer rolling surface of said rolling ring and the other of said race surfaces being positioned on the same side of said rotary axis.

3. A rolling-element bearing as defined in claim 2, comprising a first race structure containing said first race surface and a second race structure containing said second race surface; high-friction rings affixed to either side of said rolling rings at least at one of the perimeters thereof; and means carried by at least one of said race structures for axially contacting said high-friction rings.

4. A rolling-element bearing as defined in claim 2, wherein said rolling ring comprises means defining a cavity extending radially inwardly from the outer periphery of said rolling ring; discrete particles accommodated in said cavity; and a radially resilient closure closing off said cavity and having an outer face constituting part of said outer rolling surface; said resilient closure being urged against said other of said race surfaces by centrifugal forces exerted on said discrete particles.

5. A rolling-element bearing as defined in claim 2, wherein said radially inner rolling surface has oppositely located, radially inwardly tapering surface portions and an intermediate surface portion interconnecting the radially inwardly tapering surface portions; and said radially outer rolling surface has oppositely located, radially outwardly tapering surface portions and an intermediate surface portion interconnecting the radially outwardly tapering surface portions; said first and second race surfaces being constituted by grooves complemental to the cross-sectional outline of the associated rolling surface.

6. A rolling-element bearing as defined in claim 5, wherein said intermediate surface portions of said radially inner and radially outer rolling surfaces are cylindrical.

7. A rolling-element bearing as defined in claim 5, wherein said intermediate surface portions of said radially inner and radially outer rolling surfaces are frusto-conical.

8. A rolling-element bearing as defined in claim 2, wherein there are provided a plurality of rolling rings disposed in an axially spaced relationship between said first and second race surfaces; said rolling rings being angularly offset with respect to one another.

9. A rolling-element bearing as defined in claim 8, wherein the angle of offset of the rolling rings with respect to one another is uniform.

10. A rolling-element bearing as defined in claim 9, wherein the magnitude of the angle is 360° divided by the number of said rolling rings.

11. A rolling-element bearing as defined in claim 1, wherein said rolling ring has inner and outer perimeters; said radially inner and said radially outer rolling surfaces being arranged at said inner perimeter; the location of rolling engagement between said radially inner rolling surface of said rolling ring and one of said race surfaces and the location of rolling engagement between said radially outer rolling surface of said rolling ring and the other of said race surfaces being positioned on diametrically opposite sides of said rotary axis.

12. A rolling-element bearing as defined in claim 11, wherein there are provided first and second rolling rings; said first rolling ring being positioned radially inwardly of said second rolling ring; said first and said second rolling rings each having radially inner and radially outer rolling surfaces at their inner perimeter; a first race structure having radially inner and radially outer race surfaces constituting said first race surface; a second race structure having radially inner and radially outer race surfaces constituting said second race surface; said radially outer rolling surface of said first rolling ring cooperating with said radially inner race surface of said first race structure; said radially inner rolling surface of said first rolling ring cooperating with said radially inner race surface of said second race structure; said radially outer rolling surface of said second rolling ring cooperating with said radially outer race surface of said first race structure; and said radially inner rolling surface of said second rolling ring cooperating with said radially outer race surface of said second race structure.

13. A rolling-element bearing as defined in claim 12, wherein said first rolling ring, said second rolling ring and said first race structure are formed of identical, axially spaced halves arranged symmetrically and as a mirror-image of each other with respect to a central plane perpendicular to said rotary axis and passing through said second race structure.

* * * * *